C. H. KUYPER.
MOTOR VEHICLE.
APPLICATION FILED FEB. 5, 1912.
1,058,605.
Patented Apr. 8, 1913.
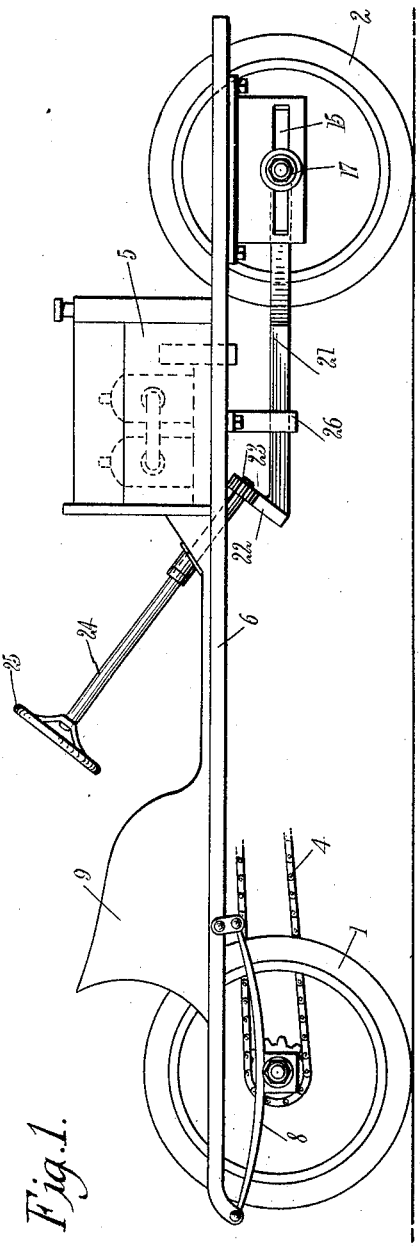
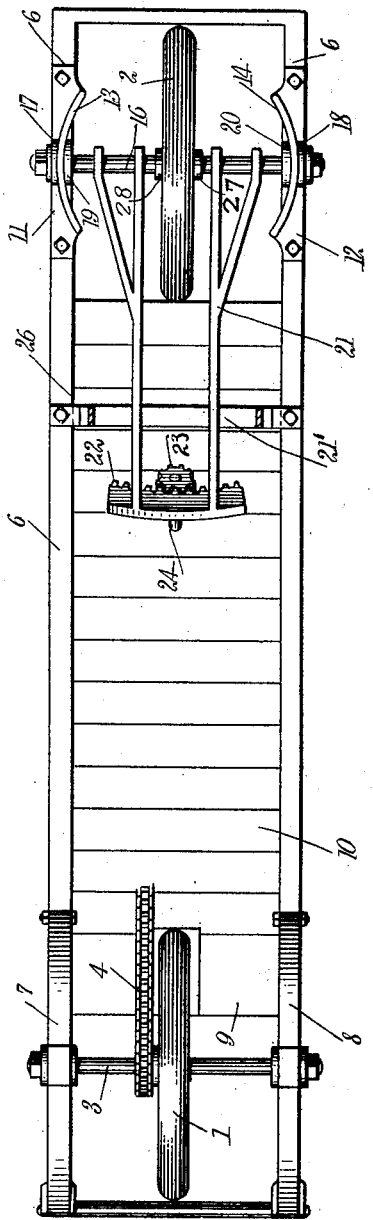
WITNESSES
George Bambay
A. S. Kitchin
INVENTOR
Charles H. Kuyper
BY Munn & Co
ATTORNEYS

UNITED STATES PATENT OFFICE.

CHARLES HUGO KUYPER, OF CINCINNATI, OHIO.

MOTOR-VEHICLE.

1,058,605.   Specification of Letters Patent.   Patented Apr. 8, 1913.

Application filed February 5, 1912. Serial No. 675,418.

*To all whom it may concern:*

Be it known that I, CHARLES H. KUYPER, a citizen of the United States, and a resident of Cincinnati, in the county of Hamilton and State of Ohio, have invented a new and Improved Motor-Vehicle, of which the following is a full, clear, and exact description.

This invention relates to motor vehicles, particularly to vehicles on the order of the two-wheeled vehicle, and has for an object the arrangement of improved means for providing the effect of an automobile body at a minimum cost with the use of a minimum number of parts, including the use of only a pair of supporting traction wheels.

Another object of the invention is the construction and arrangement of a frame or chassis designed to support a comparatively large seat and most of the various operating parts of the vehicle, on the order of an ordinary automobile frame or chassis, but utilizing only a single front and a single rear supporting wheel.

In carrying out the objects of the invention, a pair of supporting wheels of any desired kind is connected to a body or frame built on the order of an ordinary automobile body or frame, so as to give a comparatively large platform or support for a person and for accommodating an ordinary seat instead of a seat such as used on bicycles, motor-cycles, and the like. The frame is designed to carry the motor which is connected up with the rear wheel in any desired manner for rotating the same, and which is controlled by suitable steering members arranged adjacent the seat. The front wheel is mounted on a shaft movable in supporting brackets and by the steering members associated therewith, whereby the device may be guided and caused to move from place to place as may be desired.

A practical embodiment of the invention is represented in the accompanying drawings forming a part of this specification, in which similar characters of reference indicate corresponding parts in both the views.

Figure 1 is a side view of an embodiment of the invention; and Fig. 2 is a bottom plan view of the structure shown in Fig. 1.

Referring to the accompanying drawings by numerals, 1 indicates the rear wheel and 2 the front wheel. The rear wheel is mounted upon an axle 3 and is driven by a chain 4 which is connected with an engine of any desired kind, mounted preferably in a hood 5 which is supported on a frame 6. The frame 6 carries springs 7 and 8 which are connected with suitable bearings or journal boxes of the axle 3. The frame 6 may be of any desired shape and is made of a width for giving ample room for a seat 9 of substantially the ordinary structure of automobile seats. A bottom 10 is provided for the frame 6 so that when the device has once been started it will act very similar to an ordinary four-wheeled automobile. Mounted at the front of the frame 6 is a pair of brackets 11 and 12 having arc-shaped flanges 13 and 14. The flanges 13 and 14 are struck upon the arc of a circle with the center on the center of the wheel 2. Each of these flanges 13 and 14 is formed with a slot 15 for accommodating an axle 16. The axle 16 is held in place by outside shoes 17 and 18, and inside shoes 19 and 20 removably clamped to the axle 16 in any desired manner.

Rigidly connected with or loosely mounted on the axle 16 is a framework 21 which is formed with a rack 22 meshing with a pinion 23 connected with the steering shaft 24. The steering shaft 24 has an ordinary steering wheel 25 connected therewith so as to properly shift the position of the axle 16 and the wheel 2. In order to prevent the framework 21 from moving vertically, a suitable brace 26 is provided, formed with a slot 21' through which the framework 21 extends. The wheel 2 may be secured centrally of the axle 16 in any desired manner so as to freely rotate thereon, as for instance by collars 27 and 28. These collars may be held in place by any desired means, as for instance, set screws, so that when it is desired to remove the wheel 2 the nuts on the ends of axle 16 may be removed and the collars 27 and 28 loosened so that the axle may be moved longitudinally out of the machine, the slots 15 being sufficiently large for permitting this operation.

In operation the machine or engine may be started in any desired manner and then thrown into clutch with the chain 4 or the chain 4 may be continuously in clutch with the engine and the vehicle pushed manually along until the engine begins to explode.

Having thus described my invention, I claim as new and desire to secure by Letters Patent:—

1. In a vehicle of the class described, a framework, a driving wheel journaled on said framework, a steering wheel arranged near the front of said framework, an axle for supporting said steering wheel, said axle extending at right angles to the plane of said wheel, a pair of arc-shaped retaining plates for supporting the ends of said axle, said retaining plates being on opposite sides of said wheel and struck on the arc of a circle with its center coincident with the center of said wheel, each of said plates being formed with a slot for allowing a free swinging movement of said wheel and the axle carried thereby, a steering framework connected with said axle, and operating means for shifting the position of said steering framework.

2. In a vehicle of the class described, a framework, front and rear supporting wheels, a swinging axle for said front supporting wheel, said axle extending in a general direction transversely of said framework, a guiding plate arranged near each end of said axle rigidly secured to said framework, each of said plates being formed with a slot for guiding said axle, guiding members connected with said axle arranged on each side of each of said plates, means for holding said front supporting wheel in a predetermined position on said axle, a steering frame rigidly secured to said axle for swinging said axle back and forth, and steering mechanism for operating said steering frame.

3. In a vehicle of the class described, a framework, front and rear supporting wheels, a swinging axle for said front supporting wheel, a pair of guiding plates for the axle formed arc-shaped and with slots for accommodating the axle, a pair of shoes connected with said axle on each side of said guiding plate for permitting the axle to swing freely around a point intermediate the ends thereof and prevent longitudinal movement of the axle, an axle shifting framework connected therewith, and steering mechanism connected with the axle shifting framework.

In testimony whereof I have signed my name to this specification in the presence of two subscribing witnesses.

CHAS. HUGO KUYPER.

Witnesses:
 WM. McNALLY,
 GEO. D. SCHATZMAN.

---

Copies of this patent may be obtained for five cents each, by addressing the "Commissioner of Patents, Washington, D. C."